US009626803B2

(12) United States Patent
Park et al.

(10) Patent No.: US 9,626,803 B2
(45) Date of Patent: Apr. 18, 2017

(54) METHOD AND APPARATUS FOR IMAGE PROCESSING IN AUGMENTED REALITY SYSTEMS

(71) Applicant: QUALCOMM Incorporated, San Diego, CA (US)

(72) Inventors: Youngmin Park, Vienna (AT); Erick Mendez Mendez, Vienna (AT); Gerhard Reitmayr, Vienna (AT); Daniel Wagner, Vienna (AT); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 14/569,549

(22) Filed: Dec. 12, 2014

(65) Prior Publication Data

US 2016/0171768 A1    Jun. 16, 2016

(51) Int. Cl.
| | |
|---|---|
| H04N 13/00 | (2006.01) |
| G06T 19/00 | (2011.01) |
| G06T 7/38 | (2017.01) |
| G06T 7/13 | (2017.01) |

(52) U.S. Cl.
CPC .............. *G06T 19/006* (2013.01); *G06T 7/13* (2017.01); *G06T 7/38* (2017.01); *H04N 13/0037* (2013.01); *H04N 13/0051* (2013.01); *G06T 2200/04* (2013.01); *G06T 2207/10012* (2013.01); *G06T 2207/10016* (2013.01); *G06T 2207/10028* (2013.01); *H04N 2213/003* (2013.01)

(58) Field of Classification Search
IPC .................................................... G06T 19/006
See application file for complete search history.

(56) References Cited

U.S. PATENT DOCUMENTS

| | | | |
|---|---|---|---|
| 8,405,680 B1 | 3/2013 | Cardoso et al. | |
| 8,576,276 B2 | 11/2013 | Bar-Zeev et al. | |
| 2010/0328307 A1 | 12/2010 | Lim | |
| 2012/0154619 A1* | 6/2012 | Lee | G06K 9/228 348/222.1 |
| 2012/0306850 A1 | 12/2012 | Balan et al. | |
| 2012/0320039 A1 | 12/2012 | Ha et al. | |

(Continued)

OTHER PUBLICATIONS

International Search Report and Written Opinion—PCT/US2015/062319—ISA/EPO—Feb. 19, 2016, 13 pages.

(Continued)

*Primary Examiner* — Tracy Y Li
(74) *Attorney, Agent, or Firm* — Blakely Sokoloff Taylor & Zafman

(57) ABSTRACT

Disclosed are a system, apparatus, and method for depth and color camera image synchronization. Depth and color camera input images are received or otherwise obtained unsynchronized and without associated creation timestamps. An image of one type is compared with an image of a different type to determine a match for synchronization. Matches may be determined according to edge detection or depth coordinate detection. When a match is determined a synchronized pair is formed for processing within an augmented reality output. Optionally the synchronized pair may be transformed to improve the match between the image pair.

30 Claims, 9 Drawing Sheets

(56) References Cited

U.S. PATENT DOCUMENTS

2013/0301906 A1* 11/2013 Yoon ............... G06T 7/0075
 382/154
2015/0006545 A1* 1/2015 Das ............... G06F 17/30029
 707/748

OTHER PUBLICATIONS

Nair, R., et al., "A Survey on Time-of-Flight Stereo Fusion", 2013, Correct System Design, [Lecture Notes in Computer Science, Lect .Notes Computer], Springer International Publishing, Cham, pp. 105-127, XP047269358, ISSN: 0302-9743 ISBN: 978-3-642-14798-2 abstract sections "2.1 Requirements", "2.2 High Quality Depth Maps for Multimedia Application", "3.1 Pipeline", "4.1.2 Semi-synthetic GT".

Zhu, J., et al., "Spatial-Temporal Fusion for High Accuracy Depth Maps Using Dynamic MRFs", IEEE Transactions on Pattern Analysis and Machine Intelligence, IEEE Computer Society, USA, vol. 32, No. 5, May 1, 2010 (May 1, 2010), pp. 899-909, XP011321494, ISSN: 0162-8828, DOI: 10.1109/TPAMI.2009.68 abstract, figures 3, 5 p. 901, right-hand column, line 1—p. 902, right-hand column, line 55 sections "4.1 Multisensor setup", "4.2.2 Synchronization", "4.3 Experimental Architecture".

* cited by examiner

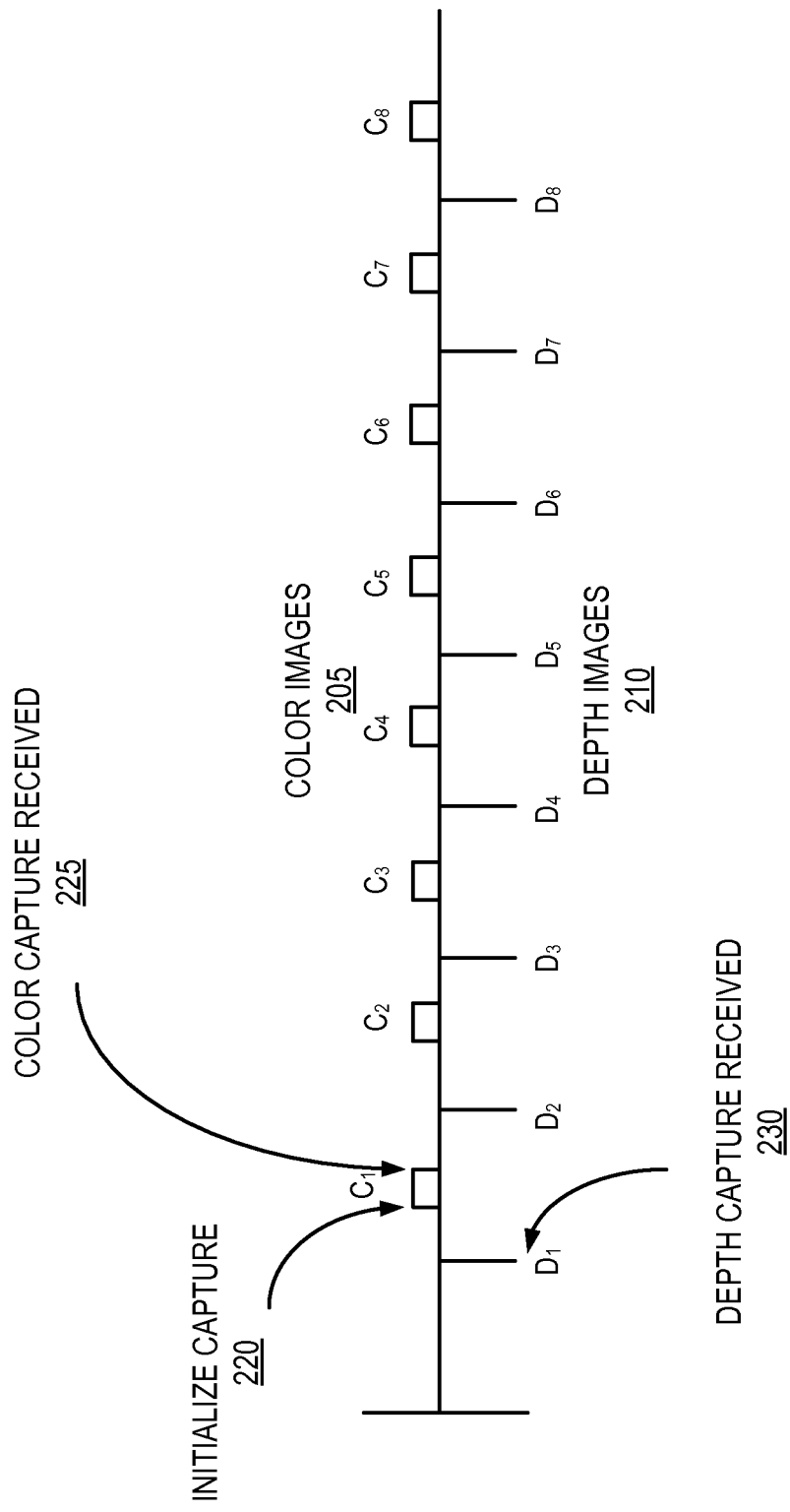

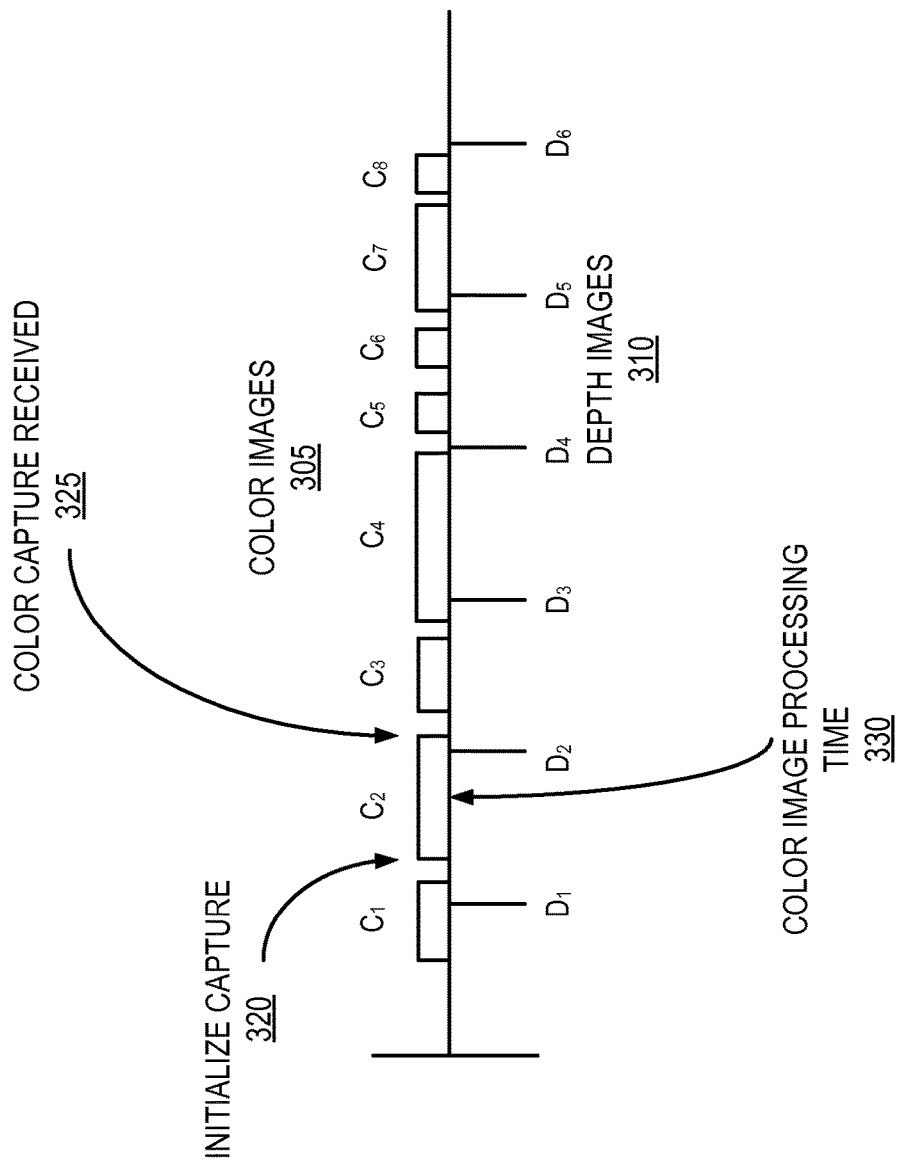

OBTAIN A PLURALITY OF INPUT IMAGES COMPRISING A FIRST IMAGE TYPE AND A SECOND IMAGE TYPE DIFFERENT FROM THE FIRST IMAGE TYPE, WHERE AN IMAGE TYPE IS EITHER A DEPTH CAMERA IMAGE TYPE OR COLOR CAMERA IMAGE TYPE, WHERE EACH IMAGE TYPE IS UNSYNCHRONIZED WITH RESPECT TO IMAGES OF OTHER TYPES, AND WHERE EACH OF THE PLURALITY OF INPUT IMAGES ARE WITHOUT IDENTIFICATION OF AN INPUT IMAGE'S ACTUAL CREATION TIME
805

SELECT FROM INPUT IMAGES OF THE FIRST IMAGE TYPE, A TARGET IMAGE
810

SELECT FROM INPUT IMAGES OF THE SECOND IMAGE TYPE, A COMPARISON IMAGE
815

DETERMINE WHETHER THE COMPARISON IMAGE IS COMPATIBLE FOR SYNCHRONIZATION WITH THE TARGET IMAGE
820

IN RESPONSE TO A DETERMINATION THAT THE TARGET IMAGE IS COMPATIBLE FOR SYNCHRONIZATION WITH THE TARGET IMAGE, IDENTIFYING THE TARGET IMAGE AND THE COMPARISON IMAGE AS A SYNCHRONIZED IMAGE PAIR
825

PROCESS THE SYNCHRONIZED IMAGE PAIR TOGETHER FOR USE IN AN AUGMENTED REALITY OUTPUT
830

FIG. 8

METHOD AND APPARATUS FOR IMAGE PROCESSING IN AUGMENTED REALITY SYSTEMS

FIELD

The subject matter disclosed herein relates generally to image processing techniques that may be applied to augmented reality systems.

BACKGROUND

Augmented reality (AR) systems are often implemented with specifically selected hardware and/or software components tested to ensure compatibility and performance. For example, an AR system may have proprietary color camera sensors and depth sensors engineered to provide output pairs of image frames (e.g., one color and one depth taken at equivalent viewpoints) at the same time. AR functionality may also be included as a feature in general or multifunction mobile devices, such as smart phones. However, these mobile devices typically are unable to synchronize output image frames from a color camera sensor with a depth sensor because the operating environment of current mobile devices do not support time synchronization or time stamps with accurate creation time identifiers from different device cameras. Output from current mobile device cameras are typically missing any reliable time stamp indicating time of creation.

Having unsynchronized cameras within a system can compromise, accuracy of AR output due to processing image pairs that may not be best matches. Cameras may be unsynchronized when a system is unable to determine when a camera sensor has captured a particular image. Systems within a mobile device for example may obtain camera output with varying amounts of delay from time of creation. For example, sensor image frames created at time $T_1$ may not be available for processing by the AR components of the mobile device until the frames are received at a later time $T_2$. The color and depth sensors may each have different time delays between creation of an image frame and output, and the frequency of output may also be different for each sensor. Therefore, new and improved techniques for processing color and depth images are desired.

SUMMARY OF THE DESCRIPTION

Embodiments disclosed herein may relate to a method for depth and color camera synchronization. The method may include obtaining a plurality of input images comprising a first image type and a second image type different from the first image type, where an image type is either a depth camera image type or color camera image type, where each image type is unsynchronized with respect to images of other types, and where each of the plurality of input images are without identification of an input image's actual creation time; selecting, from input images of the first image type, a target image. The method may also include selecting, from input images of the second image type, a comparison image and determining whether the comparison image is compatible for synchronization with the target image. The method may also further include identifying the target image and the comparison image as a synchronized image pair in response to a determination that the comparison image is compatible for synchronization with the target image. The method may additionally include processing the synchronized image pair together for use in an augmented reality output.

Embodiments disclosed herein may also relate to a machine readable non-transitory storage medium having stored therein program instructions that are executable by a processor to obtain a plurality of input images comprising a first image type and a second image type different from the first image type. An image type may be either a depth camera image type or color camera image type and each image type may be unsynchronized with respect to images of other types. Each of the plurality of input images may be without identification of an input image's actual creation time. The machine readable non-transitory storage medium may also have instructions that are executable by the processor to select, from input images of the first image type, a target image, and select, from input images of the second image type, a comparison image. The machine readable non-transitory storage medium may also have instructions that are executable by the processor to determine whether the comparison image is compatible for synchronization with the target image. In response to a determination that the comparison image is compatible for synchronization with the target image, embodiments may identify the target image and the comparison image as a synchronized image pair and process the synchronized image pair together for use in an augmented reality output.

Embodiments disclosed herein may further relate to a device for depth and color camera image synchronization comprising memory and a processor coupled to the memory and configured to obtain, from the memory, a plurality of input images comprising a first image type and a second image type different from the first image type. An image type may be either a depth camera image type or color camera image type and each image type may be unsynchronized with respect to images of other types. Each of the plurality of input images may be without identification of an input image's actual creation time. The device may be further configured to select, from input images of the first image type, a target image and select, from input images of the second image type, a comparison image. The device may be further configured to determine whether the comparison image is compatible for synchronization with the target image and in response to a determination that the comparison image is compatible for synchronization with the target image, identify the target image and the comparison image as a synchronized image pair. The device may also be configured to process the synchronized image pair together for use in an augmented reality output.

Embodiments disclosed herein may further relate to an apparatus with means to perform depth and color camera synchronization. The apparatus may include means for obtaining a plurality of input images comprising a first image type and a second image type different from the first image type, where an image type is either a depth camera image type or color camera image type, where each image type is unsynchronized with respect to images of other types, and where each of the plurality of input images are without identification of an input image's actual creation time. The apparatus may also include means for selecting, from input images of the first image type, a target image. The apparatus may also include means for selecting, from input images of the second image type, a comparison image and determining whether the comparison image is compatible for synchronization with the target image. The apparatus may also further include means for identifying the target image and the comparison image as a synchronized image pair in response to a determination that the comparison image is compatible for synchronization with the target image. The apparatus may additionally include means for processing the synchronized image pair together for use in an augmented reality output.

Other features and advantages will be apparent from the accompanying drawings and from the detailed description.

BRIEF DESCRIPTION OF THE DRAWINGS

FIG. 2 illustrates the receipt timing of a fixed rate color camera stream and a fixed rate depth image stream, in one embodiment;

FIG. 3 illustrates the receipt timing of constant depth map frames with variable color image frames, in one embodiment;

FIG. 8 illustrates a flow diagram of a method for performing DCOS, in another embodiment.

DETAILED DESCRIPTION

Augmented reality (AR) systems may leverage multiple camera inputs to provide a user with virtual object representation on a display. Device manufacturers may mix hardware and software in unforeseen ways to create new AR systems. For example, some systems may be modular and used in configurations that even the original equipment manufacturer cannot foresee. Unfortunately, operating systems of typical devices may not be equipped within timing and synchronization to properly ensure all components of a system work together towards a common AR output goal. For example, typical systems may be unable to synchronize the variety of camera sensor combinations that may be implemented. More specifically, depth camera images and color camera images used to provide AR output may not be natively synchronized or time stamped in typical AR device hardware and software implementations.

In one embodiment, Depth and Color Output Synchronization (DCOS) synchronizes color camera sensor data and depth camera sensor data (e.g., image frames from respective cameras). DCOS can select a target image from one type of sensor for matching with respect to a comparison image from a different type of sensor. DCOS may be implemented as a module or engine to receive images from the respective sensors. DCOS may track the time of receipt and begin comparison of color to depth sensor images according to that time of receipt. For example, a RGB image received at time $T_1$ may be compared to depth sensor images received before and after time $T_1$. Although the time of receipt may be different than the time of creation, it can be useful as an initial starting point for comparison.

In one embodiment, DCOS matches the target image with the comparison image according to edge detection techniques as described herein. In some embodiments, DCOS matches the target image with the comparison image using Simultaneous Localization And Mapping (SLAM) or other tracking system. In one embodiment, DCOS sets a fixed synchronization time difference between color and depth cameras for an amount of time or number of images, before testing the synchronization (e.g., performing edge detection). For example, DCOS can assume a fixed number of frames per second for each sensor to determine a frame offset (i.e., timing offset) between the two matching sensors. The frame offset may be updated (e.g., by re-running selection matching) according to processor availability or detection of drift from the frame offset.

In one embodiment, in response to synchronizing a pair of images, the embodiment optionally transforms one of the images in the pair to refine the match with the other (matching) image. The transformation reduces any remaining differences between the pair of images, further increasing matching accuracy. In some embodiments, the transformation is initialized according to the hardware configuration of the device or current cycle availability for the processor on the device.

Figure 1A:
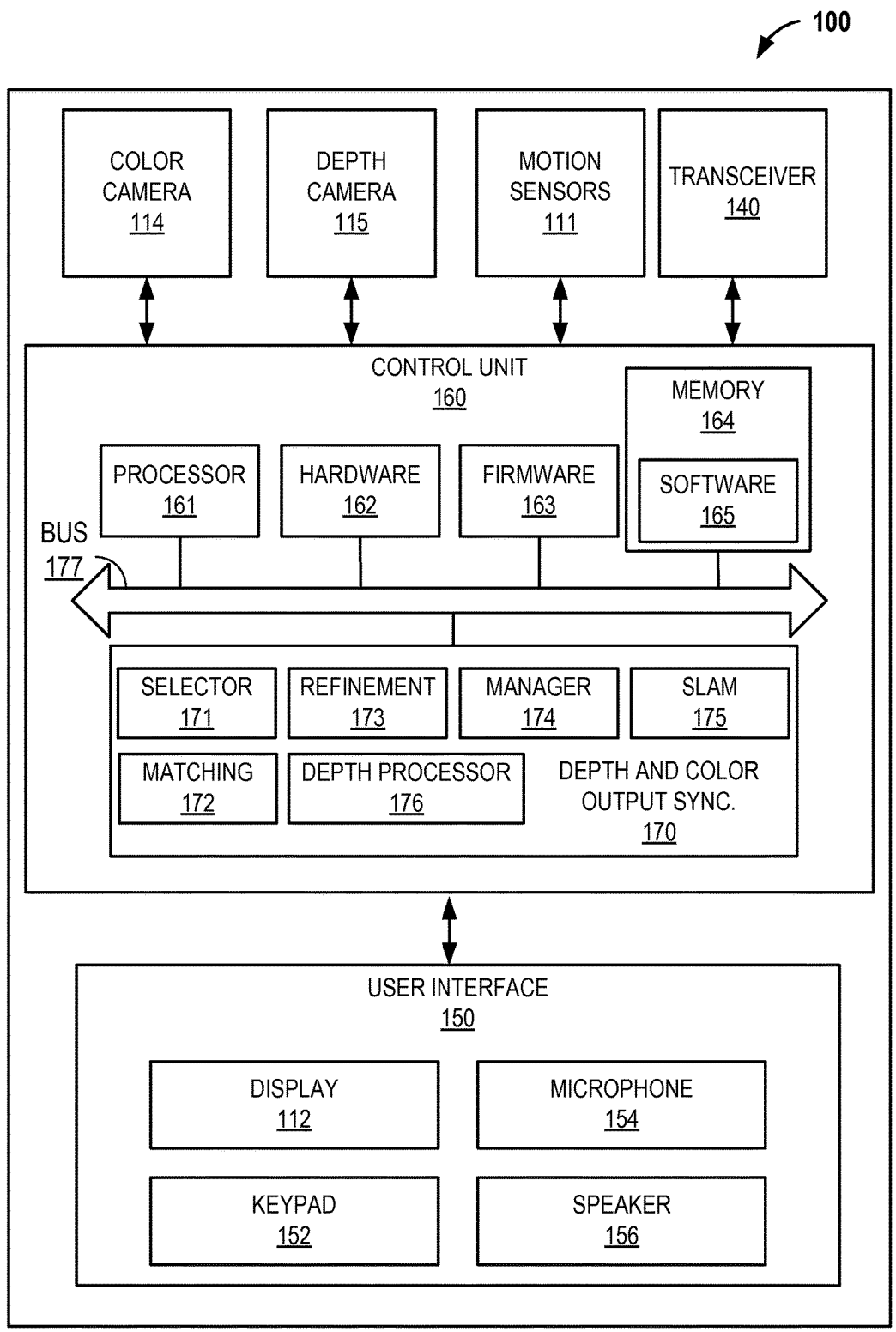
FIG. 1A is a block diagram of a system in which aspects of Depth and Color Output Synchronization (DCOS) may be practiced, in one embodiment.

FIG. 1A is a block diagram of a system in which aspects of DCOS may be practiced, in one embodiment. The system may be a device 100, which may include a general purpose processor 161 and/or the like, DCOS 170, and a memory 164. In some embodiments, DCOS 170 may further include Selector module 171, Refinement module 173, Manager module 174, SLAM module 175, and Depth Processor module 176. Device 100 may also include a number of device sensors coupled to one or more buses 177 or signal lines further coupled to at least the Selector module 171, Refinement module 173, Manager module 174, SLAM module 175, and Depth Processor module 176. DCOS 170 (and included modules 171-176) are illustrated separately from processor 161 and/or hardware 162 for clarity, but may be combined and/or implemented in the processor 161 and/or hardware 162 based on instructions in the software 165 and the firmware 163. Control unit 160 can be configured to implement methods of performing DCOS as described herein. For example, device 100 and control unit 160 can be configured to implement functions described in FIG. 8.

Device 100 may be a: mobile device, wireless device, cell phone, augmented reality device (AR), personal digital assistant, wearable device (e.g., eyeglasses, watch, head wear, or similar bodily attached device), mobile computer, tablet, personal computer, laptop computer, data processing device/system, or any type of device that has processing capabilities.

Device 100 may include a screen or display 112 capable of rendering color images, including 3D images. In some embodiments, display 112 may be used to display live images captured by camera 114, Augmented Reality (AR) images, Graphical User Interfaces (GUIs), program output, etc. In some embodiments, display 180 may comprise and/or be housed with a touchscreen to permit users to input data via some combination of virtual keyboards, icons, menus, or other Graphical User Interfaces (GUIs), user gestures and/or input devices such as styli and other writing implements. In some embodiments, display 112 may be implemented using a Liquid Crystal Display (LCD) display or a Light Emitting Diode (LED) display, such as an Organic LED (OLED) display. In other embodiments, display 112 may be a wearable display, which may be operationally coupled to, but housed separately from, other functional units in device 100. In some embodiments, device 100 may comprise ports to permit the display of the 3D reconstructed images through a separate monitor coupled to device 100.

User interface 150 may also include a keyboard, keypad 152, or other input device through which the user can input information into device 100. If desired, integrating a virtual keypad into the display 112 with a touch screen/sensor may obviate the keyboard or keypad 152. The user interface 150 may also include a microphone 154 and speaker 156, e.g., if device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

Device 100 may function as a mobile/portable platform or wireless device and may communicate via one or more wireless communication links through a wireless network that are based on or otherwise support any suitable wireless communication technology. For example, in some aspects, device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user carries their portable device). Users can interface with multiple features of device 100 in a wide variety of situations. In an AR context, a user may use their device to view a displayed representation of the real world. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

In some embodiments, device 100 may comprise image sensors such as charge-coupled device (CCD) or complementary metal-oxide-semiconductor (CMOS) sensors and/or camera(s) 114, which are hereinafter referred to as "color camera 114". Color camera 114 may convert an optical image into an electronic or digital image and may send captured images to processor 161.

In general, color camera 114 may be a color or grayscale camera, which provide "color information," while "depth information" may be provided by a depth sensor (e.g., depth sensor 115). The term "color information" as used herein refers to color information, grayscale information, monochrome information, and/or the like or some combination thereof. In general, as used herein, a color image or color information may be viewed as comprising 1 to N channels, where N is some integer dependent on the color space being used to store the image. For example, an RGB image may comprise three channels, with one channel each for Red, Blue and Green information.

Depth information may be captured in a variety of ways using depth sensors (e.g., depth sensor 115). The term "depth sensor" is used to refer to functional units that may be used to obtain depth information independently from color camera 114. For example, depth sensor 115 may be physically installed in a same general location as camera 114, however depth sensor 115 may operate at a different frequency or frame rate from camera 114. In some embodiments, although triggered or initialized at the same or approximately equal time, depth sensor 115 and camera 114 may capture different scenes. For example, because the viewpoint may be shifted (e.g., one sensor to the left or right of another) and the focal length of each camera may be different, the resulting images may differ by more than just depth vs. color content.

As a further example, depth sensor 115 may take the form of a light source coupled to device 100. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera.

In some embodiments, device 100 may comprise multiple cameras, such as dual front cameras and/or a front and rear-facing cameras, which may also incorporate various sensors. In some embodiments, cameras may be capable of capturing both still and video images. In some embodiments, cameras may be RGBD or stereoscopic video cameras capable of capturing images at 30 frames per second (fps), by way of a non-limiting example. In one embodiment, images captured by cameras may be in a raw uncompressed format and may be compressed or otherwise processed in some manner prior to being (further) processed and/or stored in memory 164. In some embodiments, image compression may be performed by processor 161 using lossless or lossy compression techniques.

In some embodiments, processor 161 may also receive input from sensors 111. Sensors 111 may comprise one or more accelerometers, one or more gyroscopes, one or more magnetometers, and/or the like just to name a few examples. In certain instances, accelerometer(s) may comprise a 3-D accelerometer, and/or gyroscope(s) may comprise a 3-D gyroscope. Sensors 111 may provide velocity, orientation, and/or other position related information to processor 161. In some embodiments, sensors 111 may output measured information associated with the capture of each image frame by camera 114 and depth sensor 115. In some embodiments, the output of sensors 111 may be used in part by processor 161 to determine a pose of cameras 114 and depth sensor 115 and/or device 100.

The pose of camera 114 refers to the position and orientation of the camera 114 relative to a frame of reference. In some embodiments, camera pose may be determined for 6-Degrees Of Freedom (6DOF), which refers to three translation components (which may be given by X,Y,Z coordinates of a frame of reference) and three angular components (e.g. roll, pitch and yaw relative to the same frame of reference).

In some embodiments, the pose of camera 114 and/or device 100 may be determined and/or tracked by processor 161 using a visual tracking solution based on images captured by camera 114. For example, SLAM Module 175 running on processor 161 may implement and execute computer vision based tracking, model-based tracking, and/or SLAM methods. SLAM refers to a class of techniques where a map of an environment, such as a map of an environment being modeled by device 100, is created while simultaneously tracking the camera's pose relative to that map. In some embodiments, the methods implemented by SLAM module 175 may be based on color or grayscale image data captured by camera 114 and may be used to generate estimates of 6DOF pose measurements of the camera. In some embodiments, the output of sensors 111 may be used to estimate, correct, and/or otherwise adjust the estimated pose. Further, in some embodiments, images captured by camera 114 and depth sensor 115 may be used to recalibrate or perform bias adjustments for sensors 111.

In one embodiment, DCOS includes a Selection module or engine (e.g., Selector module 171) to facilitate pairing of input images. For example, Selector module 171 can determine which color images and depth images should be processed by Matching module 172. Further details of Selector module 171 are described in greater detail below.

In one embodiment, DCOS includes a Matching module or engine (e.g., Matching module 172). Matching module 172 may perform edge based matching and/or depth based matching between a pair of input images (e.g., one depth image compared to one color image) as described in greater detail below.

In one embodiment, DCOS includes a Refinement module or engine (e.g., Refinement module 173). Refinement module 173 may transform an image in a synchronized image pair (e.g., a depth or color image) to further minimize matching errors and increase compatibility between the image pair. For example, Refinement module 173 may transform a depth image to an output that appears as if it were taken at the same location as the respective color image in the synchronized pair. Further details of Refinement module 173 are described below.

In one embodiment, DCOS includes a Manager module or engine (e.g., Manager module 174). Manager module 174 implements adaptive workload functionality for DCOS. For example, Manager module 174 may determine the processor and memory load of device 100 and send a message to Selector module 171 to adjust selection strategies. Further details of adaptive workload functionality of Manager module 174 are described below.

In one embodiment, DCOS includes a Depth Processor module or engine (e.g., Depth Processor module 176). Depth processor module 176 may calculate depth for individual points within each received depth camera image.

In one embodiment, DCOS can perform 6DOF SLAM (e.g., SLAM module 175), which includes tracking and mapping of a SLAM Map. In one embodiment, 6DOF SLAM (e.g., 6DOF tracking) can associate features observed from keyframes (e.g., input images from color camera 114) to the SLAM Map. 6DOF SLAM (e.g., 6DOF tracking) can use the feature point associations to determine the camera position and orientation (i.e., pose) related to a respective camera image. 6DOF mapping can also update/maintain the SLAM Map. As discussed above, the SLAM Map maintained by the 6DOF SLAM may contain 3D feature points triangulated from two or more keyframes. For example, keyframes may be selected from an image or video stream or feed to represent an observed scene. For every keyframe, DCOS can compute a respective 6DOF camera pose associated with the image. DCOS can determine camera pose by projecting features from the 3D map into an image or video frame and updating the camera pose from verified 2D-3D correspondences.

In one embodiment, DCOS extracts features from a keyframe image. A feature (e.g., feature point or interest point) as used herein is as an interesting or notable part of an image. The features extracted from the captured image may represent distinct points along three-dimensional space (e.g., coordinates on axes X, Y, and Z) and every feature point may have an associated feature location. The features in keyframes either match or fail to match (i.e., are the same or correspond to) the features of previously captured keyframes. Feature detection may be an image processing operation to examine every pixel to determine whether a feature exists at a particular pixel. Feature detection may process an entire captured image or, alternatively certain portions or parts of the captured image.

For each captured image or video frame, once features have been detected, a local image patch around the feature can be extracted. Features may be extracted using a well-known technique, such as Scale Invariant Feature Transform (SIFT), which localizes features and generates their descriptions. If desired, other techniques, such as Speed Up Robust Features (SURF), Gradient Location-Orientation histogram (GLOH), Normalized Cross Correlation (NCC) or other comparable techniques may be used.

Figure 1B:
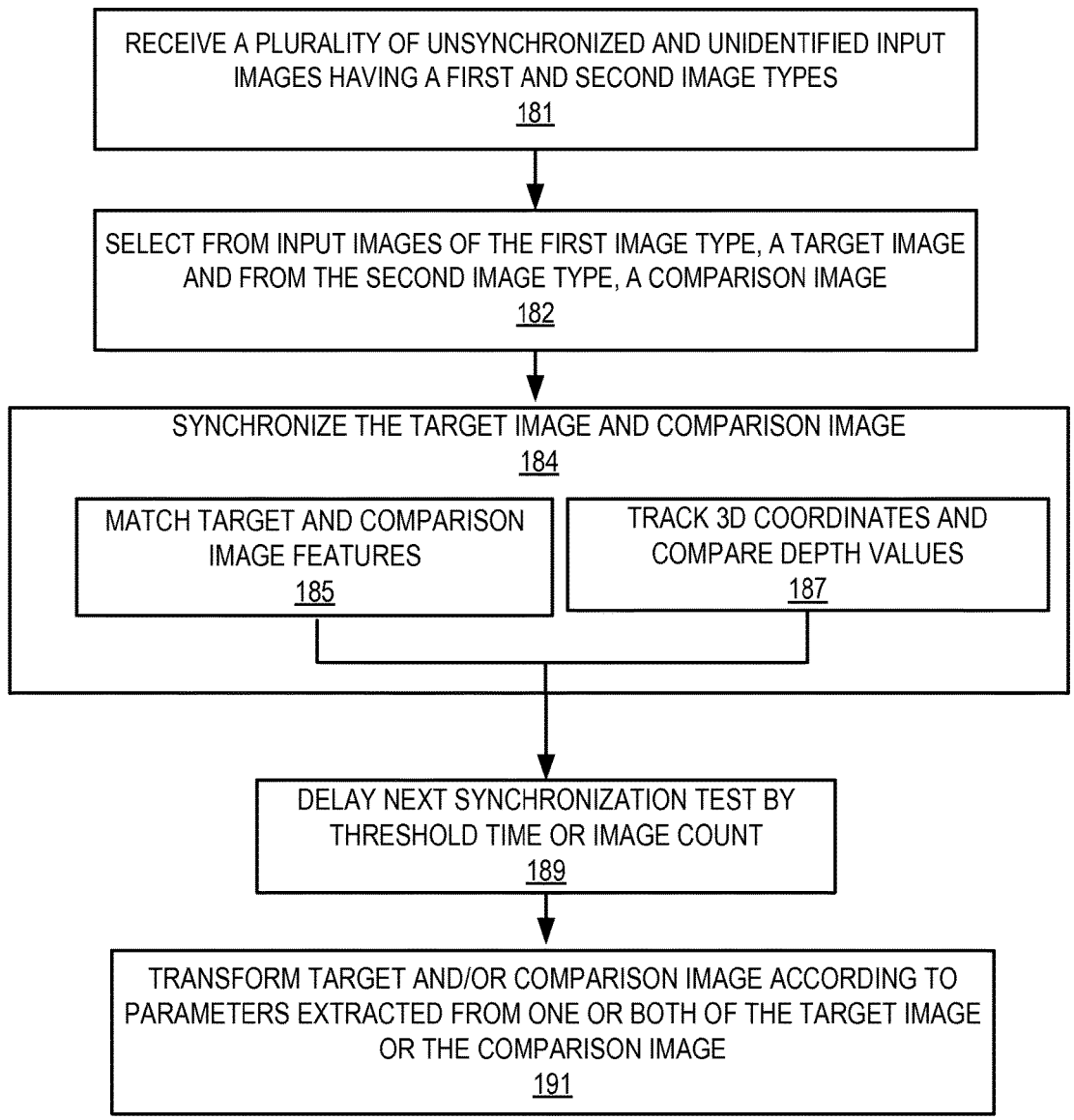
FIG. 1B illustrates a flow diagram of a method for performing DCOS, in one embodiment.

FIG. 1B illustrates a flow diagram of a method for performing DCOS, in one embodiment. At block 181, the embodiment (e.g., DCOS) receives a plurality of unsynchronized and unidentified input images having a first and second image types. For example, a first type may be a color camera type and the second image type may be a depth camera type.

At block 182, the embodiment selects, from input images of the first image type, a target image and selects from images of the second image type, a comparison image.

At block 184, the embodiment synchronizes the target image and comparison image. In one embodiment, DCOS may synchronize the target and comparison image by matching target and comparison image features at block 185, or by tracking 3D coordinates and comparing depth values at block 187.

At block 185, the embodiment performs edge detection on the target and comparison image. Edge detection for matching target and comparison image features is a flexible synchronization technique that can work in a variety of implementations. In one embodiment, DCOS detects common edges (e.g., or other image feature) shared by both the target and comparison image. In one embodiment, instead of edge detection, DCOS creates a depth map using 2 or more color images over time, and matches it with the depth map from the depth sensor.

In one embodiment, before performing edge detection, DCOS sets up a comparison queue by first determining a time of receipt for each of the plurality of input images from block 181. DCOS can create a comparison queue comprising a subset of images from the plurality of input images, where a subset of images in the comparison queue comprises images of the second image type received within a threshold time from receipt of the target image, and where the comparison image is selected from the comparison queue. In other words, DCOS sets up a range of images to compare because the exact time of creation for each image is unknown and therefore to find a synchronized pair comparisons to images received at a variety of times before and after the target image may be useful. For example, a target image from a color camera may be created at time C1 however it may arrive for processing by DCOS at time A1. Because it is initially unknown whether C1 is a time before or after A1, images arriving before and after may be tested for matching and therefore are entered into the comparison queue. In some embodiments, the comparison queue is defined by a threshold number of images of the second image type received before and after receipt of the target image. For example, the threshold may be 1, meaning that the comparison image received before the target image is received and the comparison image following after the target image is received will be testing for a match with the target image.

At block 187, the embodiment tracks coordinates and compares depth values. For example, instead of matching features at block 185, DCOS may perform SLAM. In some embodiments, SLAM may be used instead of matching features at block 185 when tracking a 3D reference map with the color images. In one embodiment, DCOS tracks three-dimensional (3D) coordinates from the plurality of input images of the color camera image type, where the 3D coordinates include depth values. DCOS determines, within the comparison image, depth values for each point having a geometrically equivalent point to the coordinates tracked in the target image. For example, DCOS can project the 3D coordinates to comparison depth images. DCOS can compare the depth values within the comparison depth image to depth values (tracked) within the target image. In some embodiments, DCOS determines a compatibility score according to the number of depth value matches between the target image and the comparison image.

At block 189, the embodiment delays a next synchronization test by a threshold time or image count. For example, in response to synchronizing the target and comparison image at block 184, a frame offset between the two images may be determined. For example, the frame offset may be a property to let the AR system know to synchronize a target image with a comparison image offset by the frame offset value (e.g., one frame ahead, two frames behind, etc.) In one embodiment, the frame offset is a timing offset between receipt time of the comparison image and the receipt time of the target image. DCOS can reference the timing offset (e.g., frame offset) to determine a next synchronized pair.

The frame offset can assist in DCOS maintaining the synchronization over time instead of frequently performing edge detection or tracking 3D coordinates to re-establish a synchronization frame offset. For example, in some implementations a color camera and depth camera may be initially "out of sync" by one or two image frames ahead or behind of the other image type. In response to synchronizing the color and depth sensor output according to a frame offset, the synchronization may stay constant with occasional synchronization tests to verify the two image sensor feeds do not fall "out of sync."

At block 191, the embodiment transforms one or both of the target image or the comparison image according to parameters extracted from one or both of the target image or the comparison image. For example, DCOS computes the direct transformation between color and depth frames and then works to transform the depth frame with the estimated transformation in order to provide a better overlap between the synchronized pair of images. In some embodiments, DCOS determines the added cost to perform the transformation should be skipped due to hardware profile of the host device, or due to the current processor queue (e.g., device is overloaded or busy).

FIG. 2 illustrates the receipt timing of a fixed rate color camera stream and a fixed rate depth image stream, in one embodiment. As illustrated in FIG. 2, color images are received in fixed time periods C1-C8 (205). For example, if a color camera captures an image of a bright or well-lit environment the color image camera can capture and process each image at approximately the same time. Image capture times may be constant because longer/varied exposure times (e.g., via shutter or rolling shutter) to capture additional light are not necessary and do not change the capture time frame to frame. As illustrated DCOS can initialize capture of a color image at 220 and color image capture may be received by DCOS at 225.

In some embodiments, the depth sensor incorporates its own IR light source, and can have a consistent/constant exposure time for each frame. The capture time for each individual depth sensor image may be the same or approximately the same as indicated by the even spacing of depth images D1-D8 (210) and constant depth capture receipt time 230.

In some embodiments, color image completion time is unknown, for example there is no reliable way to determine when an image is created. Therefore, DCOS may determine time of receipt instead of time of completion for each color image. Accordingly, because of transmission delay and other delay from the camera sensor, receipt time may not be indicative of the time of image capture. Because the time of image capture may be unknown, DCOS uses a variety of methods for synchronizing incoming images as described in greater detail below.

FIG. 3 illustrates the receipt timing of constant depth map frames with variable color image frames, in one embodiment. As illustrated in FIG. 3, an unknown and variable processing time 330 by the color camera 114 may follow initialization of an image capture at 320. Therefore, the color capture C2 may be received at some later time 325. For example, the camera image may record a mix of light and dark sources such that exposure times vary from frame to frame. Accordingly, an unsynchronized augmented reality system may receive color images at times not directly related to when the respective color image was actually captured.

Figure 4:
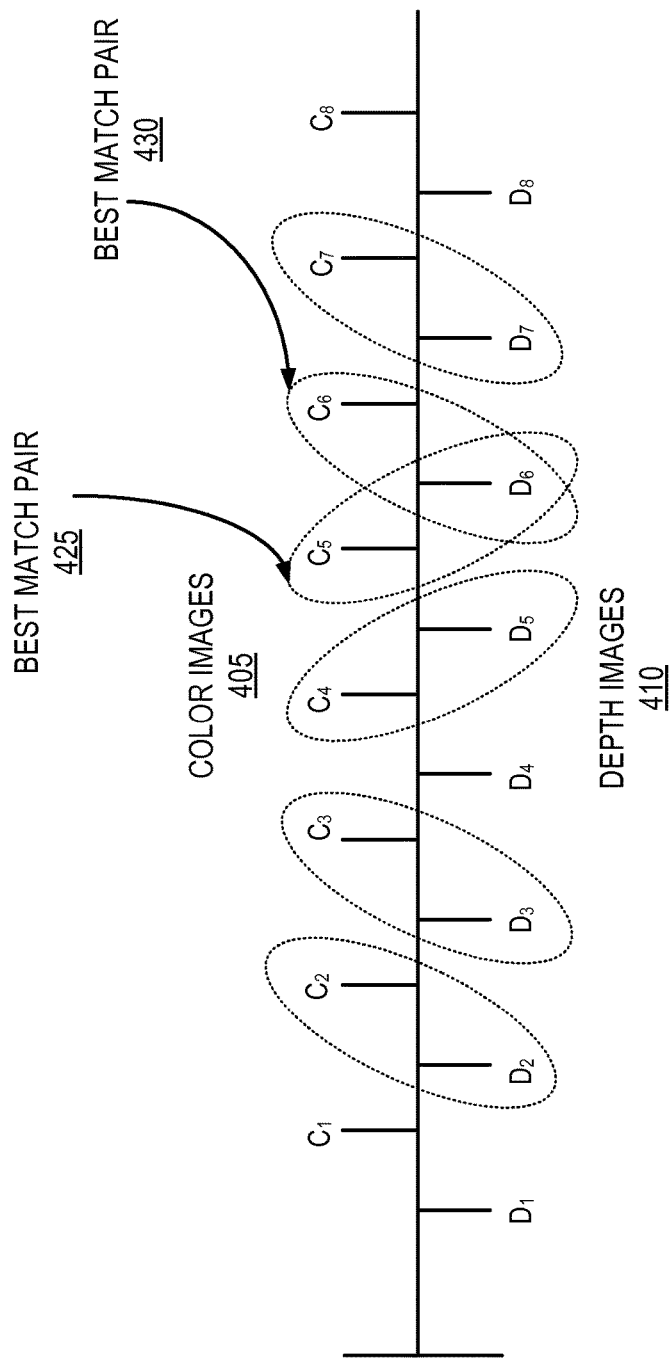
FIG. 4 illustrates the timing and matching between color and depth image streams, in one embodiment.

FIG. 4 illustrates the timing and matching between color and depth image streams, in one embodiment. As illustrated in FIG. 4, the color images 405 are not consistently matched with a prior or post receipt depth image from depth images 410. For example, color image C5 and color image C6 are both best matched (pairs 425 and 430 respectively) to depth image D6 while color image C4 is best matched to post receipt depth image D5 and color image C7 is best matched to prior receipt depth image D7.

Figure 5:
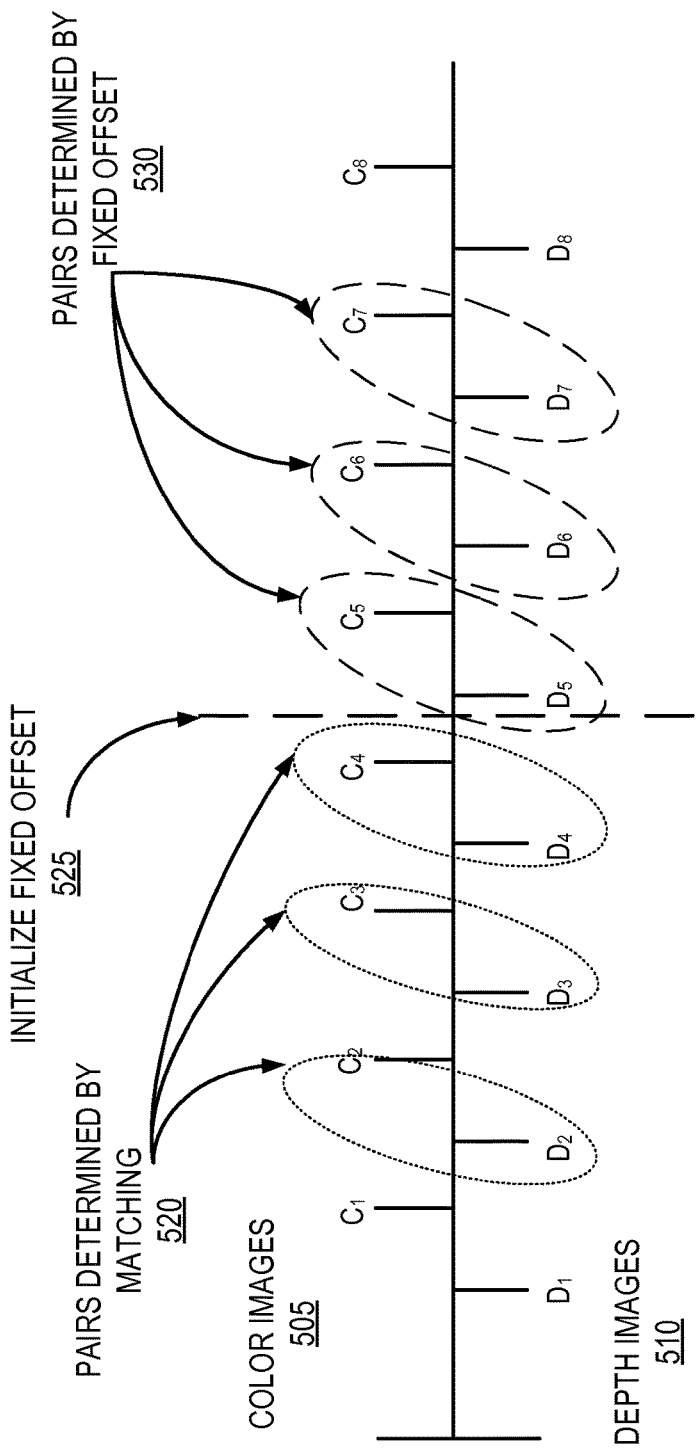
FIG. 5 illustrates the timing and matching between color and depth image streams with a fixed grid selection, in one embodiment.

FIG. 5 illustrates the timing and matching between color (505) and depth image (510) streams with a fixed grid selection, in one embodiment. In one embodiment, DCOS can determine a best available match offset (e.g., prior receipt frame, post receipt frame, or some other position or specified time offset) in response to comparing one or more possible synchronized pairs. In one embodiment, DCOS performs an optimal pair selection for a number of frames and then in response to determining the resulting offset is constant, set the offset for a predetermined time period or frame count. For example, as illustrated in FIG. 5, DCOS can determine (through analysis as described in prior FIG. 4) C2 and D2 are the best compatible matches and classify them as a synchronized pair. Next, DCOS can continue to determine the best matches and pair C3 with D3, and C4 with D4. Next, DCOS can determine that the pattern of using the adjacent and prior receipt depth frame is likely the color frame best match for future synchronized pairs and bypass subsequent match comparisons between color and depth images. Therefore, as illustrated in FIG. 5, pairs may be determined according to best match 520, and after some passage of time or passage of a predetermined set number of image frames, DCOS can fix the frame offset 525. In response to fixing the frame offset, subsequent synchronized pairs are created according to the predetermined fixed offset. For example, with regards to FIG. 5, the fixed offset is set to pair a color image frame with the prior adjacent (according to time of receipt) depth image.

Figure 6:
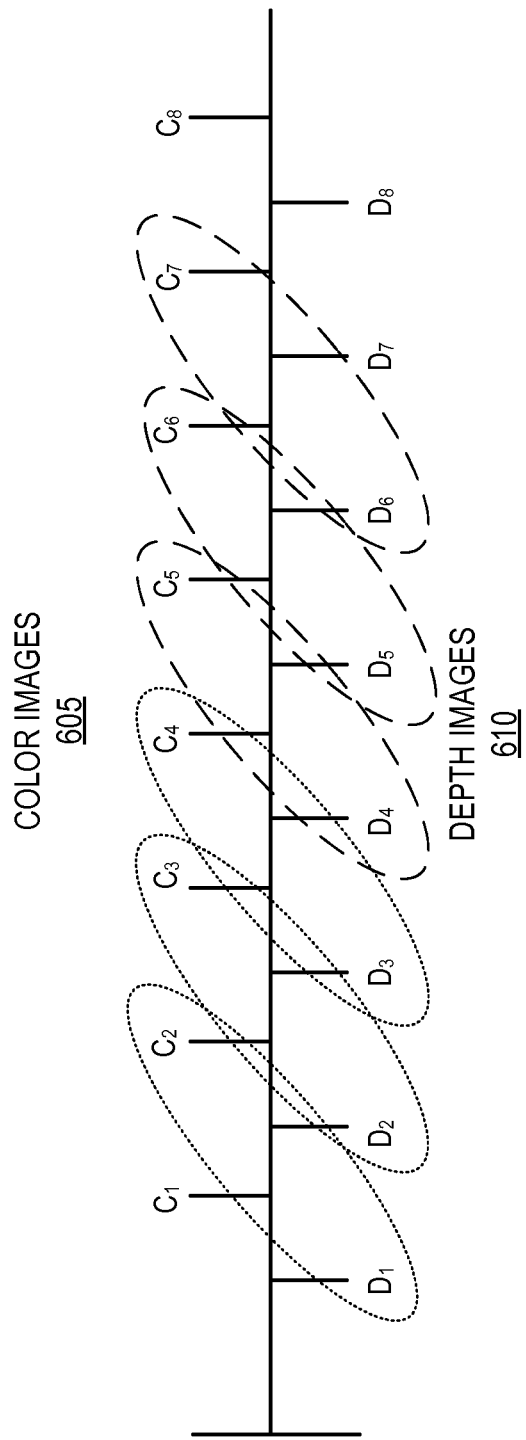
FIG. 6 illustrates the timing and matching between color and depth image streams with a fixed grid selection, in another embodiment.

FIG. 6 illustrates the timing and matching between color and depth image streams with a fixed grid selection, in another embodiment. As illustrated in FIG. 6, color images 605 maintain a fixed offset with depth images 610. For example, the depth image is synchronized with a color image arriving two places after the depth image (according to time of receipt). In other embodiments, a subsequent depth image (e.g., a next image, two images ahead in receipt time, or other offset) may be a best match instead of the illustrated two image prior match. The two places prior match as illustrated is but one example of a possible synchronized match between a color and depth image stream.

In one embodiment, DCOS tracks time passed or number of images processed since the pairing offset was assigned. In response to determining a threshold amount of time or images have passed, DCOS can determine compatibility between a next target image and a next comparison image. For example, in response to 10 minutes passing without determining if drift has occurred from the offset, DCOS can check one or more synchronized pairs to determine if the prior image match offset is still the best possible match. If a best match is still provided by the match offset, then the next time threshold may be extended. For example, DCOS can determine the match offset is correct and set a counter for 2 minutes until the next initiated match. In some embodiments, DCOS can simply disable all future matches and maintain the current match offset indefinitely.

In some embodiments, the offset is a result of an initial hardware configuration for a particular mobile device and sensor configuration. For example, mobile device A may be paired with sensors B and C. DCOS can determine an offset for synchronizing sensors B and C on the mobile device A. If the offset is maintained under a variety of circumstances no further matching needs to occur. Therefore, the configuration and included offset may be available on a remote server for clients that have a mobile device A with sensors B and C.

Figure 7:
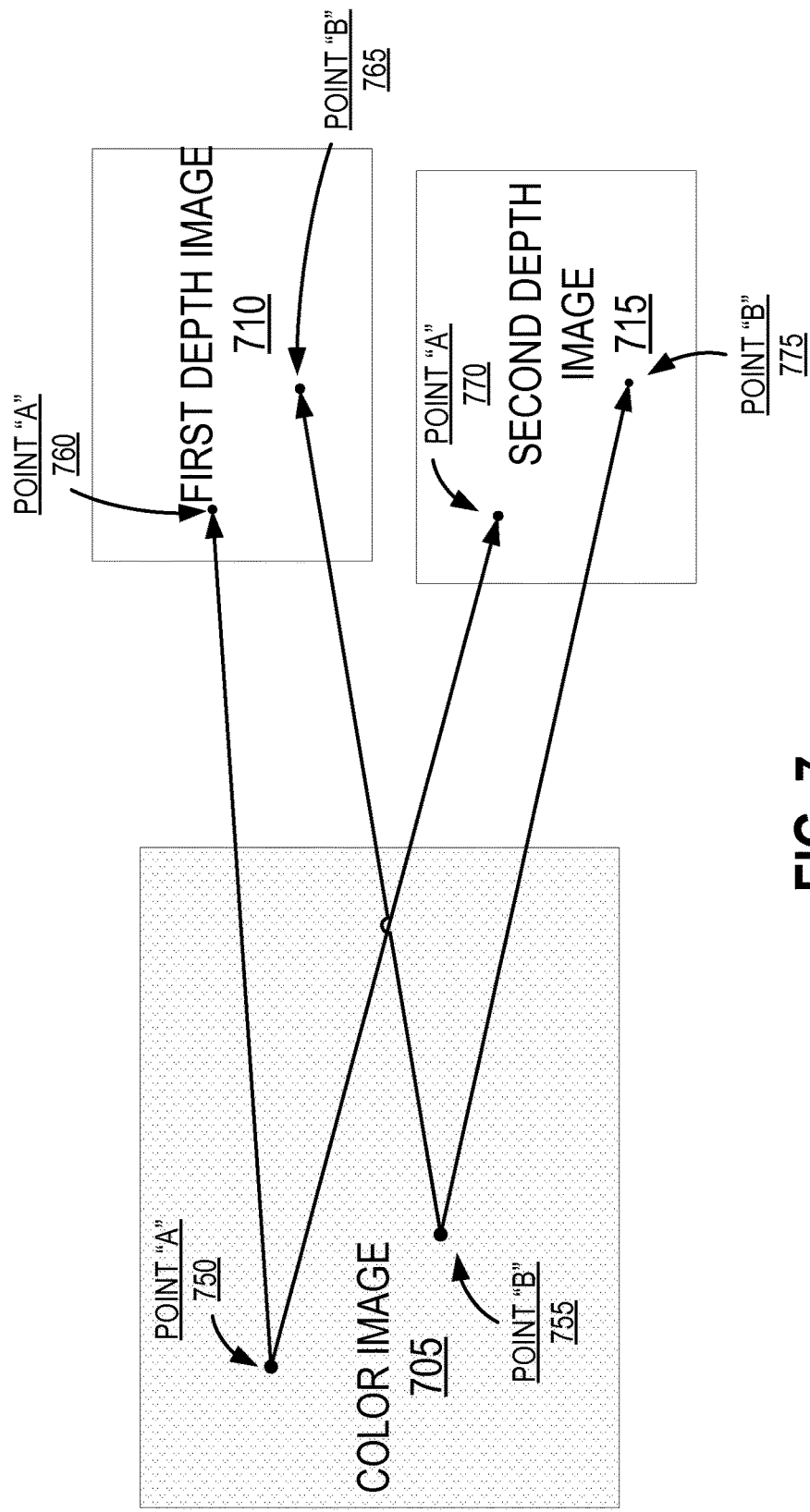
FIG. 7 illustrates selection by depth, in an example embodiment.

FIG. 7 illustrates selection by depth, in one embodiment. In one embodiment, DCOS interfaces with or is integrated with a local SLAM system on a mobile device (e.g., device 100). DCOS can leverage SLAM (or other tracking system) to track landmarks or features in the received color images. Tracked features or landmarks in a SLAM system may have known 2D coordinates and associated depth (e.g., 3D coordinates). Depth may also be considered the distance from a point in space to the point projected on the camera sensor plane at a particular camera viewpoint. Therefore, DCOS can determine for each point or pixel within each color image captured by a color camera sensor, a depth or camera distance. This depth may be compared to the depth recorded by a depth camera for a point or pixel at a same or similar position in a 2D coordinate plane (e.g., at an x-y coordinate in the depth image). In one embodiment, in addition to or as a stand alone a image synchronization/pairing method, DCOS compares the depths of features or landmarks in the color image to depths at the same position in the depth images. DCOS can assign a synchronized pair to the pair of color and depth images with the least amount of differences in depth values.

As illustrated in the example embodiment of FIG. 7, color image 705 with a Point "A" 750 and Point "B" 755 may project one or more points to one or more depth images (e.g., a first depth image 710 and a second depth image 715). Point "A" 750 and Point "B" each have different and unique x-y coordinates in color image 705. The x-y coordinates of Point "A" 750 and Point "B" 755 may be used to find equivalent points (e.g., points at the same or similar x-y coordinates) within a first depth image 710 and second depth image 715. DCOS may compare the depth of these equivalent x-y coordinate points and determine which depth image is a closest match in depth. For example, Point "A" 750 may have a depth of 5 feet and Point "A" 760 from the first depth image 710 may have a depth of 4.8 feet compared to Point "A" 770 from the second depth image 715 with a depth of 4.9 feet. A depth image depth value of 4.9 feet is closer to the color image depth of 5 feet (e.g., determined through 3D coordinate values provided by SLAM). Accordingly, DCOS may select the second depth image 715 as the most compatible match according to depth value similarity for a selected/particular point being a closest match compared to other depth images. DCOS may also test one or more other points. For example, DCOS may test/compare depth of Point "B" 755 to depth within one or more depth images (e.g., Point "B" 765 and Point "B" 775 from the first and second depth images respectively). DCOS may test any number of points within a color and depth image pair to determine an overall, average, similarity in depth values before selecting a compatible depth image for pairing/matching. In some embodiments, DCOS may test compare depth of a first point and if that depth point value comparison is not conclusive (e.g., multiple depth images have similar values to the color image depth value), DCOS can continue to test additional points until a best match is determined.

FIG. 8 illustrates a flow diagram of a method for performing DCOS, in another embodiment. At block 805, an embodiment (e.g., DCOS) obtains a plurality of input images comprising a first image type and a second image type different from the first image type. An image type may be either a depth camera image type or color camera image type. For example, a depth camera may produce depth images while a color camera produces color (or greyscale) images. Each image type may be obtained or received unsynchronized to images of other types, and each of the plurality of input images may be obtained or received without identification of an input image's actual creation time. For example, the creation of a first image may occur at time T1 and actual receipt of the image for processing into an augmented reality system may occur at a later time T2.

At block 810, the embodiment selects, from the input images of the first image type, a target image. For example, the target image may be a depth image or a color image.

At block 815, the embodiment selects, from the input images of the second image type, a comparison image. The second image type may be a different image type than the first image type associated with the target image. For example, if the target image is a color image, DCOS can select one or more depth images for comparison or analysis with respect to the target (e.g., color) image.

At block 820, the embodiment determines whether the comparison image is compatible for synchronization with the target image. In one embodiment, determining compatibility includes detecting geometric edges that exist in both the target and comparison images. Edge detection is one example of determining similarity between two scenes captured by two different camera types, however other types of matching detection is also possible and within the scope of the embodiments described herein. In other embodiments, DCOS performs 3D tracking of input color images such that 3D coordinates including depth values are known for each color image. Therefore, DCOS can compare the depth value obtained from 3D tracking of a color image (e.g., SLAM tracking) to the depth values calculated from similar points within a comparison depth image.

At block 825, the embodiment, in response to a determination that the comparison image is compatible for synchronization with the target image, the embodiment identifies the target image and the comparison image as a synchronized image pair. For example, synchronizing the target and comparison image may include linking the two images or associating a common ID or tag to both images.

In one embodiment, in response to forming a synchronized image pair, DCOS refines the synchronized pair to further minimize any matching errors of the pair. In one embodiment, DCOS refines the match between the synchronized image pair by transforming one or both of the target image or the comparison image according to parameters extracted from one or both of the target image and comparison image. Given a color image C and a depth map D, the transformation θ minimizes potential matching error. For example as detailed in equation 1 below:

$$\hat{\theta} = \underset{\theta}{\mathrm{argmin}} \sum_i \mathit{dist}(x_i, \mathit{Proj}(X_i, \theta))^2 \qquad \text{Eq. 1}$$

With regards to equation 1, $X_i$ is the contour point in the geometric edges from the depth map, $x_i$ is the corresponding contour point to $E_i$ in the color image, and θ is the 6DOF motion parameters.

At block 830, the embodiment processes the synchronized image pair together for use in an augmented reality output. For example, processing may include displaying the color image on a display while incorporating depth information extracted from the depth image.

As described above, device 100 can be a portable electronic device (e.g., smart phone, dedicated augmented reality (AR) device, game device, wearable device such as eyeglasses, or other device with AR processing and display capabilities). The device implementing the AR system described herein may be used in a variety of environments, such as shopping malls, streets, rooms, or anywhere a user may take a portable device. In an AR context, a user may use device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

In one embodiment, DCOS processes movement of device 100, input from color camera 114, and input from depth sensor 115 to display updated real-time augmentation of a target (e.g., one or more objects or scenes) in the SLAM Map. With movement of the device away from an initial reference image position, the device can capture additional images from alternate views. After extracting features and triangulating from additional keyframes, increased accuracy of the augmentation can be achieved (e.g., borders around an object may fit more precisely, the representation of the object in the scene will appear more realistic, and target placement can be more accurate relative to the camera 114 pose).

In one embodiment, DCOS inserts or integrates an object or graphic into a video stream or image captured by the camera 114 and displayed on display 112. DCOS may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time with seamless tracking from the original scene. For example, text on a sign may be replaced with alternate text, or a 3D object may be strategically placed in the scene and displayed on device 100. When the user changes the position and orientation of the camera 114, the graphic or object can be adjusted or augmented to match the relative movement of the camera 114. For example, if a virtual object is inserted into an augmented reality display, camera movement away from the virtual object can reduce the size of the virtual object relative to the distance traveled by the camera 114. For example, taking four steps back from a virtual object should cause a greater reduction in size of the virtual object compared to taking a half step back from the virtual object, all other variables being equal. Motion graphics or animation can be animated within the scene represented by DCOS. For example, an animated object can "move" within a scene depicted in the AR display. A person of skill in the art will recognize that embodiments described herein can be implemented in ways other than AR (e.g., robot positioning).

DCOS may be implemented as software, firmware, hardware, module(s) or engine(s). In one embodiment, the previous DCOS description is implemented by the general purpose processor 161 in device 100 to achieve the previously desired functions (e.g., at least the methods illustrated in FIG. 1B and FIG. 8). In one embodiment, DCOS may be implemented as an engine or module which may include additional subcomponents. In other embodiments, features of one or more of the described subcomponents may be combined or partitioned into different individual components, modules or engines.

The teachings herein may be incorporated into (e.g., implemented within or performed by) a variety of apparatuses (e.g., devices). In one embodiment, DCOS is an engine or module executed by a processor to receive images or video as input. One or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions (e.g., program instructions or code) on a non-transitory computer-readable medium. Computer-readable executable media can include both computer storage media and communication media including any medium that facilitates transfer of a computer program from one place to another. A storage media may be any available media that can be accessed or executed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the embodiments herein. Various modifications to these embodiments will be readily apparent to those skilled in the art, and the generic principles defined herein may be applied to other embodiments without departing from the spirit or scope of the embodiments described herein. Thus, the description is not intended to be limited to the embodiments shown herein but is to be accorded the widest scope consistent with the principles and novel features disclosed herein.

What is claimed is:

1. A method for depth and color camera image synchronization, the method comprising:
   obtaining a plurality of input images comprising a first image type and a second image type different from the first image type, wherein an image type is either a depth camera image type or color camera image type, wherein each image type is unsynchronized with respect to images of other types, and wherein each of the plurality of input images of the first image type and of the second image type are without identification of an input image's actual creation time;
   selecting, from input images of the first image type, a target image;
   selecting, from input images of the second image type, a comparison image;
   determining whether the comparison image is compatible for synchronization with the target image;
   in response to a determination that the comparison image is compatible for synchronization with the target image, identifying the target image and the comparison image as a synchronized image pair; and
   processing the synchronized image pair comprising the target image of the first image type and the comparison image of the second image type together for use in an augmented reality output.

2. The method of claim 1, wherein the target image is a color camera image type, and the comparison image is a depth camera image type, and wherein determining whether the comparison image is compatible for synchronization with the target image further comprises:
   tracking three-dimensional (3D) coordinates from the plurality of input images of the color camera image type, wherein the 3D coordinates include depth values;
   determining, within the comparison image, depth values for each point having a geometrically equivalent point to the coordinates tracked in the target image;
   comparing the depth values within the comparison image to depth values within the target image; and
   determining a compatibility score according to a number of depth value matches between the target image and the comparison image.

3. The method of claim 1, wherein determining whether the comparison image is compatible for synchronization with the target image further comprises:
   performing edge detection on the target image and the comparison image; and
   determining a compatibility score according to a number of same edge matches between the target image and the comparison image.

4. The method of claim 1, further comprising:
   determining a time of receipt for each of the plurality of input images;

creating a comparison queue comprising a subset of
images from the plurality of input images, wherein the
subset of images in the comparison queue comprises
images of the second image type received within a
threshold time from receipt of the target image, and
wherein the comparison image is selected from the
comparison queue.

5. The method of claim 4, wherein the comparison queue comprises a threshold number of images of the second image type received before and after receipt of the target image.

6. The method of claim 1, further comprising:
determining a timing offset between receipt time of the comparison image and the receipt time of the target image; and
referencing the timing offset to determine a next synchronized pair.

7. The method of claim 6, further comprising:
tracking one or both of an amount of time passed or a number of images processed;
determining one or both of threshold amount of time passed or number of images processed is met;
determining compatibility between a next target image and a next comparison image; and
assigning a next synchronized image pair of together for use in the augmented reality output.

8. The method of claim 1, further comprising:
transforming one or both of the target image or the comparison image according to parameters extracted from one or both of the target image or the comparison image.

9. A device for depth and color camera image synchronization comprising:
memory; and
a processor coupled to the memory and configured to:
obtain, from the memory, a plurality of input images comprising a first image type and a second image type different from the first image type, wherein an image type is either a depth camera image type or color camera image type, wherein each image type is unsynchronized with respect to images of other types, and wherein each of the plurality of input images of the first image type and of the second image type are without identification of an input image's actual creation time;
select, from input images of the first image type, a target image;
select, from input images of the second image type, a comparison image;
determine whether the comparison image is compatible for synchronization with the target image;
in response to a determination that the comparison image is compatible for synchronization with the target image, identify the target image and the comparison image as a synchronized image pair; and
process the synchronized image pair comprising the target image of the first image type and the comparison image of the second image type together for use in an augmented reality output.

10. The device of claim 9, wherein the target image is a color camera image type, and the comparison image is a depth camera image type, and wherein to determine whether the comparison image is compatible for synchronization with the target image the processor is further configured to:
track three-dimensional (3D) coordinates from the plurality of input images of the target image, wherein the 3D coordinates include depth values;
determine, within the comparison image, depth values for each point having a geometrically equivalent point to the coordinates tracked in the target image;
compare the depth values within the comparison image to depth values within the target image; and
determine a compatibility score according to a number of depth value matches between the target image and the comparison image.

11. The device of claim 9, wherein to determine whether the comparison image is compatible for synchronization with the target image the processor the processor is further configured to:
perform edge detection on the target image and the comparison image; and
determine a compatibility score according to a number of same edge matches between the target image and the comparison image.

12. The device of claim 9, wherein the processor is further configured to:
determine a time of receipt for each of the plurality of input images;
create a comparison queue comprising a subset of images from the plurality of input images, wherein the subset of images in the comparison queue comprises images of the second image type received within a threshold time from receipt of the target image, and wherein the comparison image is selected from the comparison queue.

13. The device of claim 12, wherein the comparison queue comprises a threshold number of images of the second image type received before and after receipt of the target image.

14. The device of claim 9, wherein the processor is further configured to:
determine a timing offset between receipt time of the comparison image and the receipt time of the target image; and
reference the timing offset to determine a next synchronized pair.

15. The device of claim 14, wherein the processor is further configured to:
track one or both of an amount of time passed or a number of images processed;
determine one or both of threshold amount of time passed or number of images processed is met;
determine compatibility between a next target image and a next comparison image; and
assign a next synchronized image pair of together for use in the augmented reality output.

16. The device of claim 9, wherein the processor is further configured to:
transforming one or both of the target image or the comparison image according to parameters extracted from one or both of the target image or the comparison image.

17. A machine readable non-transitory storage medium having stored therein program instructions that are executable by a processor to:
obtain a plurality of input images comprising a first image type and a second image type different from the first image type, wherein an image type is either a depth camera image type or color camera image type, wherein each image type is unsynchronized with respect to images of other types, and wherein each of the plurality of input images of the first image type and of the second image type are without identification of an input image's actual creation time;

select, from input images of the first image type, a target image;

select, from input images of the second image type, a comparison image;

determine whether the comparison image is compatible for synchronization with the target image;

in response to a determination that the comparison image is compatible for synchronization with the target image, identify the target image and the comparison image as a synchronized image pair; and process the synchronized image pair comprising the target image of the first image type and the comparison image of the second image type together for use in an augmented reality output.

18. The medium of claim 17, wherein the target image is a color camera image type, and the comparison image is a depth camera image type, and wherein to determine whether the comparison image is compatible for synchronization with the target image the program instructions are further executable by the processor to:

track three-dimensional (3D) coordinates from the plurality of input images of the target image, wherein the 3D coordinates include depth values;

determine, within the comparison image, depth values for each point having a geometrically equivalent point to the coordinates tracked in the target image;

compare the depth values within the comparison image to depth values within the target image; and determine a compatibility score according to a number of depth value matches between the target image and the comparison image.

19. The medium of claim 17, wherein to determine whether the comparison image is compatible for synchronization with the target image the program instructions are further executable by the processor to:

perform edge detection on the target image and the comparison image; and determine a compatibility score according to a number of same edge matches between the target image and the comparison image.

20. The medium of claim 17, wherein the program instructions are further executable by the processor to:

determine a time of receipt for each of the plurality of input images;

create a comparison queue comprising a subset of images from the plurality of input images, wherein the subset of images in the comparison queue comprises images of the second image type received within a threshold time from receipt of the target image, and wherein the comparison image is selected from the comparison queue.

21. The medium of claim 20, wherein the comparison queue comprises a threshold number of images of the second image type received before and after receipt of the target image.

22. The medium of claim 17, wherein the program instructions are further executable by the processor to:

determine a timing offset between receipt time of the comparison image and the receipt time of the target image;

reference the timing offset to determine a next synchronized pair;

track one or both of an amount of time passed or a number of images processed;

determine one or both of threshold amount of time passed or number of images processed is met;

determine compatibility between a next target image and a next comparison image; and assign a next synchronized image pair of together for use in the augmented reality output.

23. The medium of claim 17, wherein the program instructions are further executable by the processor to:

transform one or both of the target image or the comparison image according to parameters extracted from one or both of the target image or comparison image.

24. An apparatus to synchronize depth and color camera images, the apparatus comprising:

means for obtaining a plurality of input images comprising a first image type and a second image type different from the first image type, wherein an image type is either a depth camera image type or color camera image type, wherein each image type is received unsynchronized with respect to images of other types, and wherein each of the plurality of input images of the first image type and of the second image type are received without identification of an input image's actual creation time;

means for selecting, from input images of the first image type, a target image;

means for selecting, from input images of the second image type, a comparison image;

means for determining whether the comparison image is compatible for synchronization with the target image;

means for identifying that the target image and the comparison image as a synchronized image pair, in response to a determination that the comparison image is compatible for synchronization with the target image; and means for processing the synchronized image pair comprising the target image of the first image type and the comparison image of the second image type together for use in an augmented reality output.

25. The apparatus of claim 24, wherein the target image is a color camera image type, and the comparison image is a depth camera image type, and further comprising:

means for tracking three-dimensional (3D) coordinates from the plurality of input images of the target image, wherein the 3D coordinates include depth values;

means for determining, within the comparison image, depth values for each point having a geometrically equivalent point to the coordinates tracked in the target image;

means for comparing the depth values within the comparison image to depth values within the target image; and means for determining a compatibility score according to a number of depth value matches between the target image and the comparison image.

26. The apparatus of claim 25, further comprising:

means for performing edge detection on the target image and the comparison image; and means for determining a compatibility score according to a number of same edge matches between the target image and the comparison image.

27. The apparatus of claim 25, further comprising:

means for determining a time of receipt for each of the plurality of input images;

means for creating a comparison queue comprising a subset of images from the plurality of input images, wherein the subset of images in the comparison queue comprises images of the second image type received within a threshold time from receipt of the target image, and wherein the comparison image is selected from the comparison queue.

28. The apparatus of claim 27, wherein the comparison queue comprises a threshold number of images of the second image type received before and after receipt of the target image.

29. The apparatus of claim 25, further comprising:
means for determining a timing offset between receipt time of the comparison image and the receipt time of the target image;
means for referencing the timing offset to determine a next synchronized pair;
means for tracking one or both of an amount of time passed or a number of images processed;
means for determining one or both of threshold amount of time passed or number of images processed is met;
means for determining compatibility between a next target image and a next comparison image; and
means for assigning a next synchronized image pair of together for use in the augmented reality output.

30. The apparatus of claim 25, further comprising:
means for transforming one or both of the target image or the comparison image according to parameters extracted from one or both of the target image or the comparison image.

* * * * *